Feb. 18, 1941.  C. A. RICH  2,231,947
SEAL
Filed Dec. 6, 1937
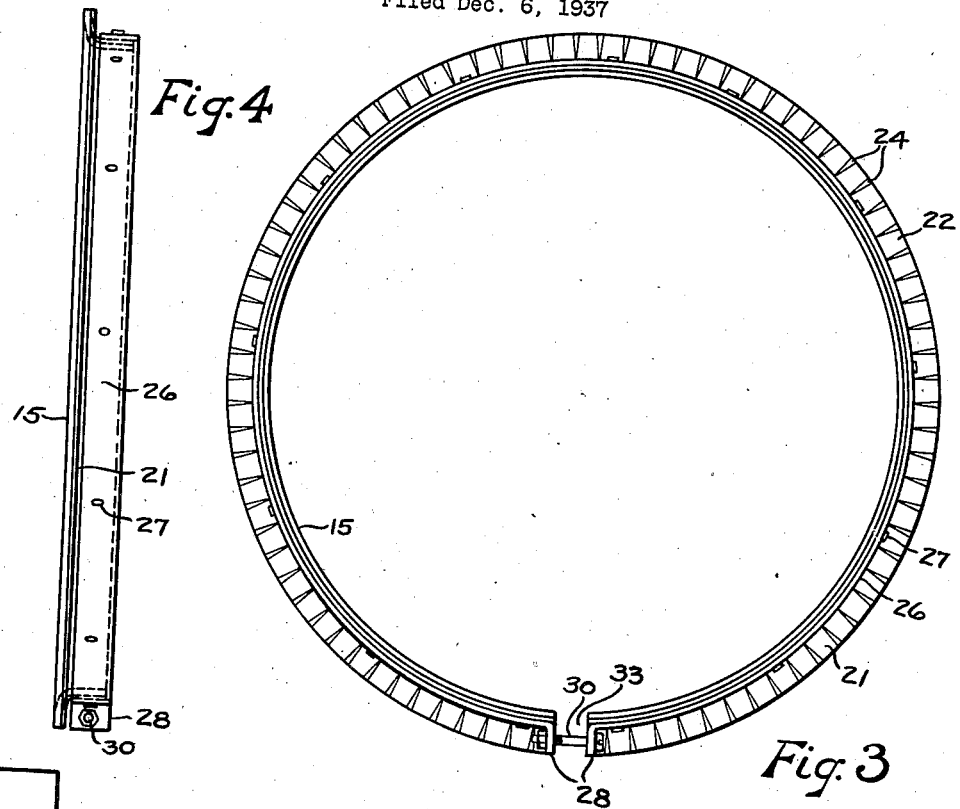
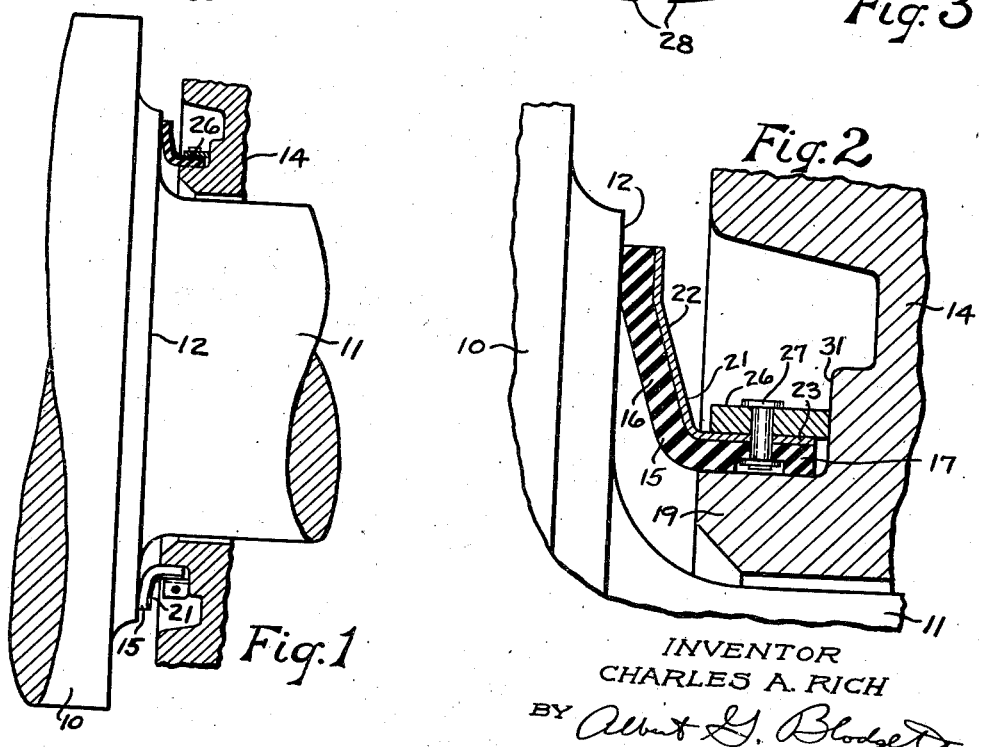
INVENTOR
CHARLES A. RICH
BY Albert G. Blodgett
ATTORNEY Patented Feb. 18, 1941

2,231,947

UNITED STATES PATENT OFFICE 2,231,947

SEAL

Charles A. Rich, Worcester, Mass., assignor to Morgan Construction Company, Worcester, Mass., a corporation of Massachusetts Application December 6, 1937, Serial No. 178,215

1 Claim. (Cl. 286—11)

This invention relates to seals, and more particularly to the construction and arrangement of seals for excluding foreign matter, such as water and scale, from the roll neck bearings in a rolling mill.

In the rolling of hot metal bars, strips, sheets, etc., it is customary to apply large quantities of water to the rolls, and much of the scale which is produced by oxidation of the stock is carried away by the water. If this water and scale reaches the roll neck bearings or mingles with the bearing lubricant, serious damage may result. Various types of seals have been employed heretofore to solve this problem, but these prior constructions have not proven to be entirely satisfactory. In some cases the seals have been complicated and expensive, and in other cases it has been necessary to use extreme precision in manufacture in order that the parts might be interchangeable to facilitate replacement. In still other cases the seals have failed to operate efficiently, and foreign matter has not been excluded as desired. Certain prior seal constructions have been subject to rapid wear, with a comparatively short life of service.

It is accordingly one object of the invention to provide a seal which will be comparatively simple and inexpensive to manufacture.

It is a further object of the invention to provide a seal which will not require great precision in its manufacture, and yet will be interchangeable with other similar seals to facilitate replacement of the seals when worn.

It is a further object of the invention to provide a seal which will be highly efficient in excluding foreign matter, and which will remain efficient throughout a long life of service.

With these and other objects in view, as will be apparent to those skilled in the art, the invention resides in the combination of parts set forth in the specification and covered by the claim appended hereto.

Referring to the drawing illustrating one embodiment of the invention and in which like reference numerals indicate like parts, Fig. 1 is a view showing the invention applied to a horizontal roll, certain parts being shown in longitudinal section;

Fig. 2 is a fragmentary view of a portion of Fig. 1, on a greatly enlarged scale;

Fig. 3 is an elevation of a seal, viewed in the axial direction; and

Fig. 4 is a side elevation of the seal.

The embodiment illustrated comprises a horizontal roll 10 having a roll neck 11 and a shoulder 12 on the end of the roll barrel. The roll neck 11 is rotatably supported in a bearing having a casing 14 of which only a portion is shown. The roll neck bearing is preferably of the oil film type disclosed in the United States patent to Dahlstrom No. 2,018,055.

In the process of rolling hot metal, large quantities of water are applied to the roll 10, and it is important to exclude this water and any scale carried thereby from the roll neck bearings. For this purpose an annular sealing element 15 is supported by the bearing casing 14 in surrounding relation to the roll neck 11 and in contact with the shoulder 12 on the roll. This sealing element 15 is formed of a comparatively thin strip of a suitable flexible material, such as rubber, and comprises a sealing portion 16, (Fig. 2) which flares radially outward and which is preferably inclined at a small angle toward the shoulder 12. This portion 16 as shown is generally frusto-conical in shape, with a large conical angle, and contact with the shoulder 12 occurs over an annular area located adjacent the outer margin of the sealing element. The outwardly flaring portion 16 is supported at its inner edge, and for this purpose the element 15 is preferably made generally L-shaped in cross-section, one leg of the L being formed by the portion 16 and the other leg being formed by a substantially cylindrical portion 17 extending toward the casing 14 and supported thereby. The casing 14 is provided with an annular rib 19 which projects toward the shoulder 12, this rib having a cylindrical outer surface which contacts with the inner surface of the portion 17 of the sealing element to support the same.

The natural resilience of the sealing element 15 is preferably supplemented by suitable spring means arranged to maintain the sealing element in firm contact with the shoulder 12. For this purpose I have shown a comparatively thin metal strip 21 similar in shape to the element 15 and engaging its outer surface. This strip 21 is likewise L-shaped in cross-section, with an outwardly flaring leg 22 generally frusto-conical in shape and an inner leg 23 substantially cylindrical in shape. As shown in Fig. 3, the outer portion 22 is provided with notches or serrations 24 to increase its flexibility.

In order to secure the sealing element 15 and the spring 21 firmly in position, I preferably utilize a metal band 26 bent into a circular form and engaging the outer surface of the portion 23 of the spring. This band is shown fastened to the parts 23 and 17 by means of a series of circumferentially spaced rivets 27. The ends of the band 26 are slightly spaced apart, as shown in Fig. 3, and bent to provide a pair of outwardly extending lugs 28 which are connected by a bolt 30. By tightening this bolt the parts may be clamped firmly in position. It will be noted in Fig. 2 that one edge of the band 26 engages a shoulder 31 on the casing 14 at assembly, this serving to locate the seal accurately in the axial direction.

It is desirable to facilitate the immediate escape of any water which might find its way inwardly between the seal 15 and the shoulder 12. For this purpose the seal 15 and the spring 21 are interrupted to form a gap or opening 33 (Fig. 3) which is preferably coextensive with the space between the lugs 28. At assembly this opening 33 is placed at the bottom, beneath the roll neck 11, so that water may flow outwardly therethrough by gravity.

The operation of the invention will now be apparent from the above disclosure. As the roll 10 rotates, the serrated spring 21 holds the outer edge of the sealing element 15 in firm contact with the shoulder 12. This provides a very effective seal to exclude water and scale from the interior of the bearing casing 14, and any such foreign matter as does enter will immediately escape through the opening 33 at the bottom. The bolt 30 provides a very simple means for clamping the parts securely to the bearing casing irrespective of slight variations in the diameter of the seal or of the rib 19. Hence the seals can be made interchangeable without requiring great accuracy in manufacture, and they can be readily applied to bearings which have been used in the past with other types of seals, so long as the bearing casing provides a surface on which the seal can be mounted. When the bearing is withdrawn from the roll neck, the seal will remain attached to the bearing casing, but may be easily removed therefrom if desired by first loosening the bolt 30. The seal is comparatively simple and inexpensive to manufacture, and it will operate efficiently throughout a long life of service.

Having thus described my invention, what I claim as new and desire to secure by Letters Patent is:

In combination with a horizontal rotatable element having a shoulder, a bearing casing surrounding a portion of said element and provided with our annular rib which extends toward the shoulder, an annular seal surrounding the rib and extending into sealing contact with the shoulder, the seal being interrupted beneath the element to provide a gap, and fastening means connecting the ends of the seal adjacent the gap to draw said ends toward one another in such a manner as to secure the seal firmly to the rib without entirely closing said gap.

CHARLES A. RICH.